3,247,149
STABILIZED UREA-FORMALDEHYDE RESIN CORE BINDER AND METHOD OF PREPARATION
Arnold A. Alek, Chicago, Ill., assignor to International Harvester Company, Chicago, Ill., a corporation of New Jersey
Filed Mar. 1, 1963, Ser. No. 262,093
10 Claims. (Cl. 260—29.4)

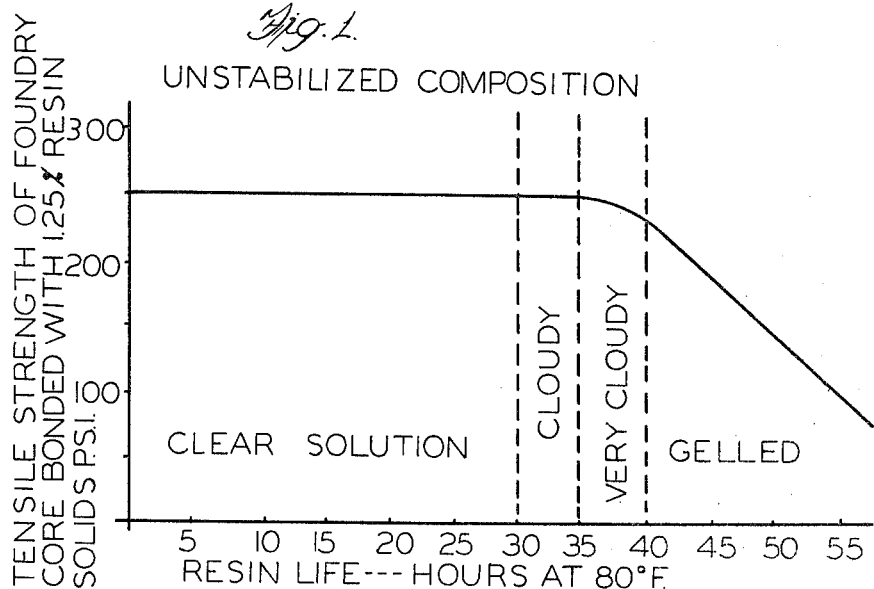
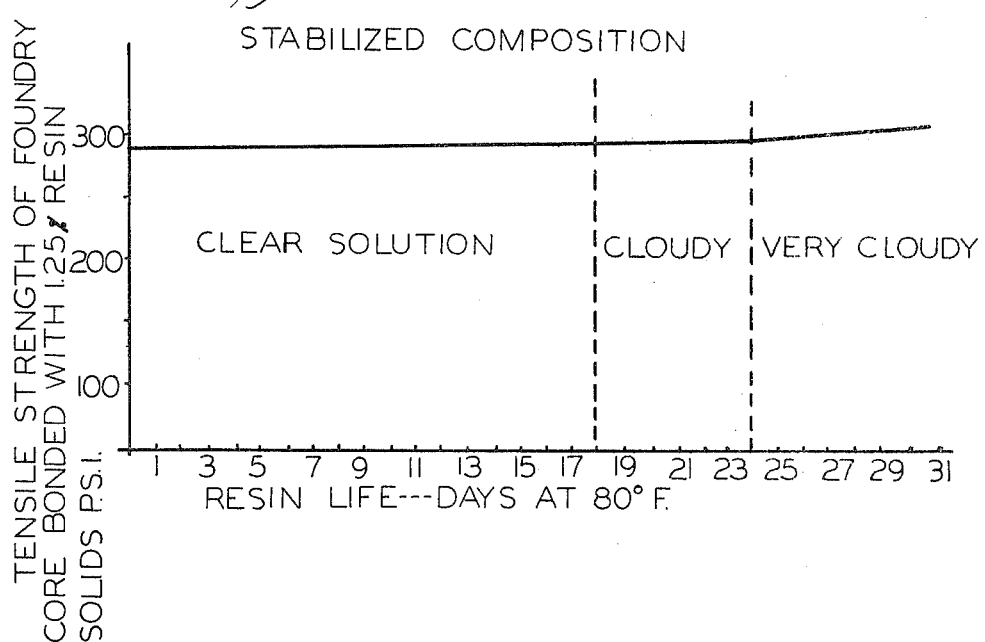

This invention relates to a core-binding composition having improved stability. More in particular this invention relates to improving the stability of urea-formaldehyde resin type core binders. Still more in particular this invention relates to a method for improving the stability of urea-formaldehyde resin type core binders.

Whenever urea and formaldehyde are mixed in the molar ratios of 1 to 2.75 mols of formaldehyde to one of urea, a chemical reaction occurs leading to the formation of a product known as dimethylol urea. This reaction continues to a point where paraformaldehyde polymer is formed as a white viscous substance which ultimately causes gelation of the mass. Fully gelled polymethylol urea acquires the appearance of solid lard and in such state is no longer useful as binder for making foundry cores.

The conventional method employed by foundries is to mix urea-formaldehyde resin concentrate (85% urea-formaldehyde resin with 15% water) with additional water and urea crystals. The mixture is allowed to age for about 4 hours during which time formaldehyde is evolved which evolution is obnoxious to foundry workers if the composition is used prior to the aforesaid aging period. The useful "shelf life" of this conventional binder composition is about two days maximum at about 80° F. which necessitates making up the composition almost on a day-to-day basis. This procedure is of course expensive through excessive labor cost, time and wastage of overage material. It is therefore a prime object of the present invention to provide a urea-formaldehyde type core-binding composition having a substantially increased shelf life.

A further important object of this invention is to provide a method for preparing a urea-formaldehyde type core binder resulting in a product having a substantially increased shelf life.

These and other objects inherent in and encompassed by the invention will be further understood from the ensuing description of a preferred embodiment of the invention disclosed in the following specification, the appended claims and the annexed drawings wherein:

FIGURE 1 is a graph illustrating the tensile strength of foundry cores made with a conventional urea-formaldehyde resin binder composition versus the age of the composition; and FIGURE 2 is a graph similar to that of FIGURE 1 employing the same binder composition except modified according to this invention.

During experimental work directed toward increasing the stability of urea-formaldehyde adhesive compositions it was observed that the addition of about 1% by weight of commercial iso-octyl alcohol increased the shelf life of the urea-formaldehyde resin composition to an unexpected degree. The following examples demonstrate this observation clearly.

EXAMPLE 1

In a suitable container 55 lbs. of urea crystals was first dissolved in 55 lbs. of water at room temperature of about 80° F. To this admixture 110 lbs. of water soluble urea-formaldehyde resin concentrate (85% urea-formaldehyde resin and 15% water) was added which concentrate is commercially available. The mixture was stirred but not heated. Evolution of free formaldehyde gas was strongly evident at the outset but after 4 hours such evolution subsided to a considerable extent where it was no longer seriously objectionable to personnel making cores. Thereafter cores were made periodically, each containing about 1.25% by weight of the resin in conventional molding sand, baked at about 425° F. for one-half hour to cure the resin, cooled and conventionally tested for tensile strength. The results are shown in the graph of FIGURE 1 where it will be seen that deterioration begins after about 30 hours from preparation when the composition begins to be cloudy although deterioration in tensile strength of the cores did not become noticeable until after about 35 hours from preparation.

EXAMPLE 2

The same proportions of the same ingredients described in Example 1 were employed and mixed in the same manner. However to the mixture was added, as an additional ingredient, 2.2 lbs. (1% by weight) of commercial iso-octyl alcohol and the resulting mass stirred for a few minutes (about 10 minutes) and thereafter allowed to come to rest. Owing to the low solubility of the iso-octyl alcohol, some of the excess alcohol formed a layer on top of the fluid mixture. At this point it was observed that no appreciable odor of formaldehyde was detected. A series of cores were then made periodically using the resulting composition drawn from the bottom of the container but otherwise the same as that for Example 1. After baking and testing the results are shown in FIGURE 2 of the drawings. Although the composition began to appear cloudy on the 18th day and later on about the 24th day appeared white, nevertheless the tensile strength of the cores appeared to be increasing at the end of 30 days. The increase in tensile strength beyond the 24th day is not understood and accordingly no attempt is made here to offer an explanation for this unexpected result except that subsequent experiments employing greater proportions of iso-octyl alcohol showed no further improvement.

The observations made as above described suggested that the functional group or radical (i.e. hydroxyl group) of the alcohol was a significant factor in obtaining the above mentioned results. However, later experiments showed that such a supposition was apparently erroneous for numerous other alcohols, as shown in Table I, were tried in the same manner as that of Example 2 but only the octyl alcohols and decyl alcohol produced significant improvement in stability of the composition.

*Table I*

| No. | Alcohol | No. of Carbon Atoms | Composition Life at 80° F., days |
|---|---|---|---|
| 1 | Methanol | 1 | 2 |
| 2 | Ethanol | 2 | 2 |
| 3 | Propyl | 3 | 2 |
| 4 | Isopropyl | 3 | 2 |
| 5 | Butyl (normal) | 4 | 2 |
| 6 | Iso Butyl | 4 | 2 |
| 7 | Butyl (secondary) | 4 | 2 |
| 8 | Hexyl | 6 | 2 |
| 9 | Octyl (normal) | 8 | 7 |
| 10 | Octyl (secondary) | 8 | 7 |
| 11 | Iso-Octyl | 8 | 30 |
| 12 | 2-Methyl, 3-Ethyl Pentanol | 8 | 3 |
| 13 | 2-Ethyl, 1-Hexanol | 8 | 3 |
| 14 | Decyl (normal) | 10 | 15 |
| 15 | Dodecyl | 12 | 2 |
| 16 | Tetradecanol | 14 | 2 |
| 17 | Pentadecanol | 15 | 3 |
| 18 | Hexadecanol | 16 | 3 |
| 19 | Heptadecanol | 17 | 3 |

From Table I it is clear that the octyl and decyl alcohols are the only ones found which surprisingly increased the shelf life of the composition described in the above Example 1. Thus the presence of the hydroxyl group in the alcohols does not appear to be a significant factor and a plausible explanation based on chemical principles is unknown. In this respect it may be significant to note that in the preparation of the binder compositions no external heat was applied. In any event in respect of the octyl and decyl alcohols the improved results are wholly unexpected and unexplained. It should also be observed that the stabilized binder composition employing octyl or decyl alcohols of this invention may be used immediately after preparation as no 4-hour aging period illustrated in Example 1 is necessary.

Having thus described preferred embodiments of the invention it can now be seen that the objects of the invention have been fully achieved and it must be understood that changes and modifications may be made which do not depart from the spirit of the invention nor from the scope thereof as defined in the appended claims.

What is claimed is:

1. A stabilized curable adhesive resin composition consisting of a mixture of about one part by weight of urea, about one part by weight of water, about two parts by weight of a water soluble urea-formaldehyde resin concentrate, said concentrate consisting of about 85% by weight of the reaction product formed by the reaction of 1 to 2.75 mols of formaldehyde to one mol of urea proportion dissolved in about 15% by weight of water, and an effective amount up to about 0.04 part by weight of a stabilizing agent selected from the group consisting of octyl alcohol and decyl alcohol.

2. A stabilized curable adhesive resin composition according to claim 1 wherein the stabilizing agent is iso-octyl alcohol.

3. A stabilized curable adhesive resin composition according to claim 1 wherein the stabilizing agent is normal octyl alcohol.

4. A stabilized curable adhesive resin composition according to claim 1 wherein the stabilizing agent is secondary octyl alcohol.

5. A stabilized curable adhesive resin composition according to claim 1 wherein the stabilizing agent is decyl alcohol.

6. The method of preparing at ambient temperatures a stabilized curable adhesive resin composition consisting of the steps of dissolving about one part by weight of urea in about one part by weight of water, adding to the resulting solution with agitation about two parts by weight of a water soluble urea-formaldehyde resin concentrate, said concentrate consisting of about 85% by weight of the reaction product formed by the reaction of 1 to 2.75 mols of formaldehyde to one mol of urea in proportion dissolved in about 15% by weight of water, adding with agitation to the mass thus obtained an effective amount up to 0.04 part by weight of a stabilizing agent selected from the group consisting of octyl alcohol and decyl alcohol, discontinuing agitation and subsequently withdrawing said composition for use from a position below any meniscus formed by the resulting mass.

7. The method of preparing a stabilized curable adhesive resin composition according to claim 6 wherein the stabilizing agent is iso-octyl alcohol.

8. The method of preparing a stabilized curable adhesive resin composition according to claim 6 wherein the stabilizing agent is normal octyl alcohol.

9. The method of preparing a stabilized curable adhesive resin composition according to claim 6 wherein the stabilizing agent is secondary octyl alcohol.

10. The method of preparing a stabilized curable adhesive resin composition according to claim 6 wherein the stabilizing agent is decyl alcohol.

References Cited by the Examiner

UNITED STATES PATENTS 2,242,484  5/1941  Schroy et al. _____ 260—29.4

FOREIGN PATENTS 561,791  8/1958  Canada.
613,708  1/1961  Canada.

MURRAY TILLMAN, *Primary Examiner.*

J. C. BLEUTGE, *Assistant Examiner.*